US008113015B2

(12) United States Patent
Burdette

(10) Patent No.: US 8,113,015 B2
(45) Date of Patent: Feb. 14, 2012

(54) CONTROL OF THE BOW OF A GLASS RIBBON

(75) Inventor: Steven R. Burdette, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 357 days.

(21) Appl. No.: 12/486,236

(22) Filed: Jun. 17, 2009

(65) Prior Publication Data

US 2010/0319402 A1 Dec. 23, 2010

(51) Int. Cl.
*C03B 25/10* (2006.01)
*C03B 17/06* (2006.01)
*C03B 15/00* (2006.01)
*C03B 13/00* (2006.01)

(52) U.S. Cl. .................. 65/93; 65/90; 65/91; 65/95
(58) Field of Classification Search .................. None
See application file for complete search history.

(56) References Cited

U.S. PATENT DOCUMENTS

| | | | | |
|---|---|---|---|---|
| 2,002,544 | A * | 5/1935 | Monro | 65/95 |
| 2,608,798 | A * | 9/1952 | Sharp | 65/84 |
| 3,506,429 | A * | 4/1970 | Overman | 65/203 |
| 3,563,719 | A * | 2/1971 | Sleighter et al. | 65/95 |
| 3,775,080 | A * | 11/1973 | Brichard | 65/95 |
| 7,260,959 | B2 | 8/2007 | Chang et al. | 65/25.3 |
| 2007/0056323 | A1 * | 3/2007 | Pitbladdo | 65/90 |
| 2007/0062219 | A1 * | 3/2007 | Blevins et al. | 65/91 |
| 2007/0220920 | A1 * | 9/2007 | Allaire et al. | 65/29.12 |
| 2008/0131651 | A1 * | 6/2008 | Burdette et al. | 428/98 |
| 2009/0226733 | A1 * | 9/2009 | Kato et al. | 428/428 |
| 2009/0314032 | A1 | 12/2009 | Tomamoto et al. | |
| 2010/0031702 | A1 * | 2/2010 | Tomamoto et al. | 65/91 |
| 2010/0126226 | A1 * | 5/2010 | Zhou et al. | 65/158 |
| 2010/0269542 | A1 * | 10/2010 | Nishiura et al. | 65/95 |
| 2011/0100056 | A1 * | 5/2011 | Anderson et al. | 65/90 |

(Continued)

FOREIGN PATENT DOCUMENTS

JP 2000044278 A * 2/2000

(Continued)

OTHER PUBLICATIONS

"Air Systems: Air Duct Design", Handbook of Air Conditioning and Refrigeration, $2^{nd}$ Edition, McGraw-Hill, Chapter 17, 2001, pp. 17.1-17.79.

(Continued)

*Primary Examiner* — Matthew Daniels
*Assistant Examiner* — Jodi C Franklin
(74) *Attorney, Agent, or Firm* — Thomas R. Beall

(57) ABSTRACT

Methods for controlling the bow (shape) of a vertical glass ribbon (13) produced by a downdraw process are provided. The methods involve passing the ribbon (13) through a gas-filled vertical enclosure (23), e.g., a draw tower, whose bottom (31) is open to the atmosphere. The ribbon (13) acts as a septum that divides the enclosure's internal volume (29) into a first sub-volume (25) and a second sub-volume (27). Using the stack effect, a positive pressure difference is produced between the first sub-volume (25) and the second sub-volume (27) along at least a portion of the length of the enclosure (the DDZ). The edges of the ribbon (13) are constrained so that they do not move into the second sub-volume (27) over at least the DDZ. As a result, the ribbon bows with its concavity facing the first sub-volume (25) and its convexity facing the second sub-volume (27).

7 Claims, 5 Drawing Sheets

U.S. PATENT DOCUMENTS

| | | | |
|---|---|---|---|
| 2011/0167873 A1* | 7/2011 | Anderson et al. | 65/91 |
| 2011/0177287 A1* | 7/2011 | Kato et al. | 428/141 |
| 2011/0177290 A1* | 7/2011 | Tomamoto et al. | 428/142 |
| 2011/0197634 A1* | 8/2011 | Eta | 65/97 |
| 2011/0217521 A1* | 9/2011 | Teranishi et al. | 428/189 |
| 2011/0223386 A1* | 9/2011 | Tomamoto et al. | 428/156 |

FOREIGN PATENT DOCUMENTS

| | | | |
|---|---|---|---|
| JP | 2008-133174 | | 6/2008 |
| JP | 2009196879 A | * | 9/2009 |
| WO | 2006/026261 | | 3/2006 |
| WO | WO2008/066667 | | 6/2008 |
| WO | 2008/140677 | | 11/2008 |
| WO | 2008/140678 | | 11/2008 |
| WO | 2008/147558 | | 12/2008 |
| WO | WO 2009081740 A1 | * | 7/2009 |

OTHER PUBLICATIONS

"Duct Design", 2009 ASHRAE Handbook—Fundamentals, I-P Edition, Chapter 21, 2009, 21.1-21.67.

English translation (by computer) of JP 2008-133174.

* cited by examiner

CONTROL OF THE BOW OF A GLASS RIBBON

FIELD

This disclosure relates to glass ribbons produced by a downdraw process, such as the overflow fusion downdraw process. More particularly, the disclosure relates to methods and apparatus for controlling out-of-plane bow of such a ribbon. The control can involve stabilizing an existing bow or producing a new bow.

BACKGROUND

As is well known, the overflow fusion downdraw process is one of the leading glass making process for making substrates for use in manufacturing display devices. As is also well known, display devices are used in a variety of applications. For example, thin film transistor liquid crystal displays (TFT-LCDs) are used in, among other things, notebook computers, flat panel desktop monitors, LCD televisions, and a variety of communication devices.

Many display devices, such as TFT-LCD panels and organic light-emitting diode (OLED) panels, are made directly on flat glass sheets (glass substrates). To increase production rates and reduce costs, a typical panel manufacturing process simultaneously produces multiple panels on a single substrate.

To take advantage of economics of scale, display manufacturers require ever larger substrates so that more displays and/or larger displays can be manufactured on an individual substrate. The production of larger substrates has proved challenging to the glass manufacturing industry, especially in view of the fact that the substrate thickness is typically less than a millimeter, e.g., 0.7 millimeters historically and currently as low as 0.3 millimeters in some cases.

Particularly challenging has been the problem of managing the behavior of the glass ribbon in the drawing tower. As can be imagined, as the ribbon becomes wider and thinner, it becomes susceptible to complex motions and shapes as it is cooled while moving downward over distances on the order of two stories or more. Because of the demanding standards for substrates used in display devices, the quality portion of the ribbon must remain pristine, thus limiting the potential areas for contact with the ribbon to the ribbon's outer edges (bead portions).

As a consequence of these considerations, the problem of controlling the shape of the ribbon has become a serious engineering challenge. The problem can be formulated as controlling the shape of a moving material without touching the middle of the material where: (i) the material has mechanical properties not unlike those of tissue paper, (ii) the material is being produced continuously in widths of two or more meters, and (iii) the material is subject to complex temperature and stress distributions which dynamically affect the material's mechanical properties. The present disclosure addresses this problem and provides methods for forming and/or stabilizing an out-of-plane bow in a vertical glass ribbon without contacting the quality portion of the ribbon.

SUMMARY

In accordance with the present disclosure, a method of controlling the bow of a vertical glass ribbon (13) produced by a downdraw process is provided where the method includes:

(a) passing the ribbon (13) through a gas-filled vertical enclosure (23), wherein:
  (i) the enclosure (23) includes a wall (17) that defines an internal volume (29),
  (ii) the bottom (31) of the internal volume (29) is open so that the pressure at the bottom is the pressure of the surrounding atmosphere, and
  (iii) the ribbon (13) acts as a septum that divides the enclosure's internal volume (29) into a first sub-volume (25) and a second sub-volume (27);

(b) producing a positive pressure difference between the first sub-volume (25) and the second sub-volume (27) along at least a portion of the length of the enclosure (23) by creating, over a vertical zone along the length of the enclosure (23), a difference between (i) the average density of gas which is on the first sub-volume (25) side of the ribbon (13) and (ii) the average density of gas which is on the second sub-volume (27) side of the ribbon (13), the average density on the first sub-volume (25) side of the ribbon (13) being less than the average density on the second sub-volume (27) side of the ribbon (13); and (c) constraining (21) the edges of the ribbon (13) so as to prevent movement of the edges into the second sub-volume (27) over at least the vertical zone.

The reference numbers used in the above summary of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION OF THE PREFERRED EMBODIMENT

The following discussion is in terms of an overflow fusion downdraw process (also known as a fusion process, an overflow downdraw process, or an overflow process), it being understood that the methods and apparatus disclosed herein are also applicable to other downdraw glass making processes such as a slot draw process. As fusion apparatus is known in the art, details are omitted so as to not obscure the description of the example embodiments.

Figure 1:
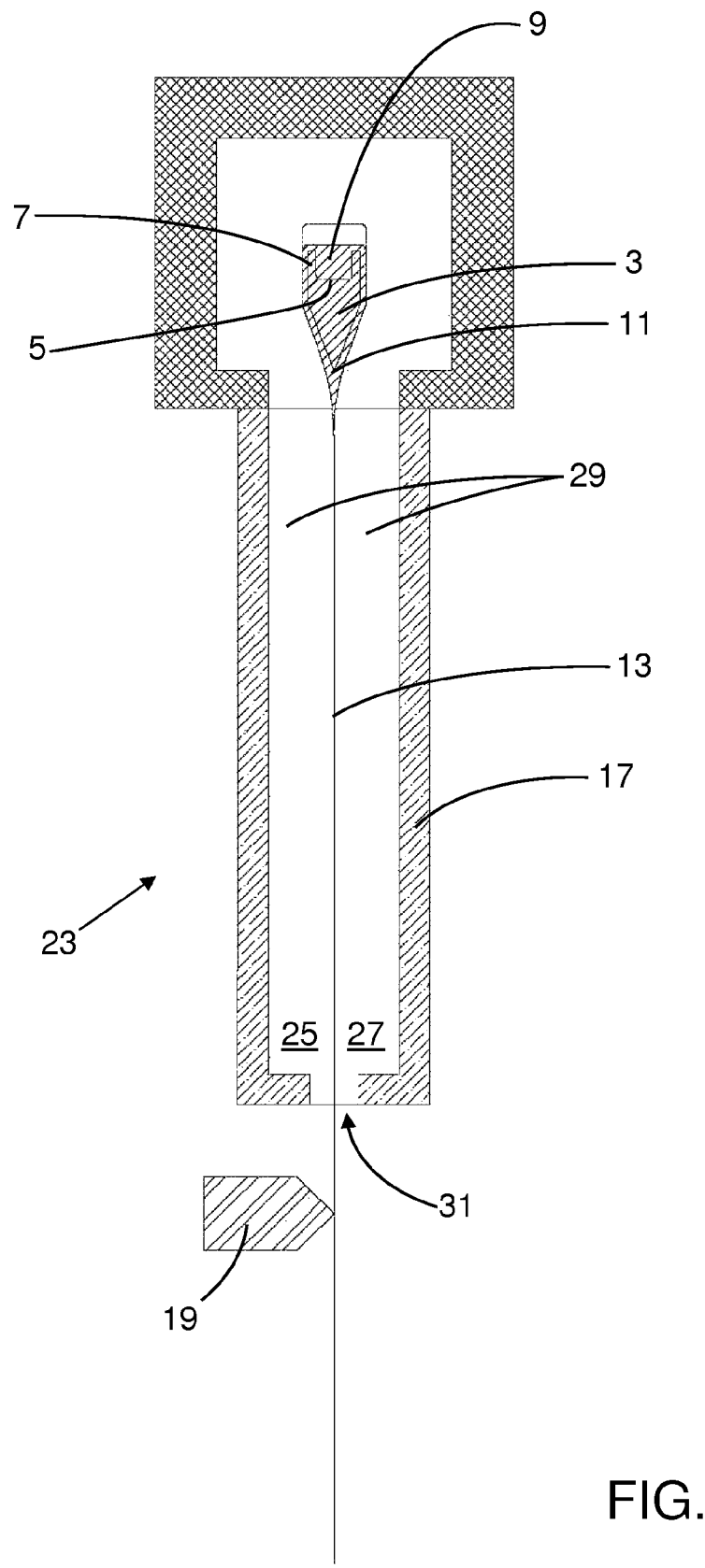
FIG. 1 is a schematic, cross-sectional, view of a fusion glass fabrication apparatus in accordance with an example embodiment.

As shown in FIG. 1, a typical fusion apparatus employs a forming structure (isopipe) 3, which includes a trough 5 defined by weirs 7 for receiving molten glass 9 from a delivery tube (not shown). The molten glass flows over weirs 7 and down along the outer surfaces of the isopipe until it reaches the pipe's root 1. At that point, the two sheets of molten glass from the two converging sides of the isopipe join together to form a single ribbon 13. Downstream of the root, one or more sets of pulling rollers (not shown) contact the outer edge portions of the ribbon and apply tension to the ribbon to draw it away from the root at a controlled rate.

Figure 3:
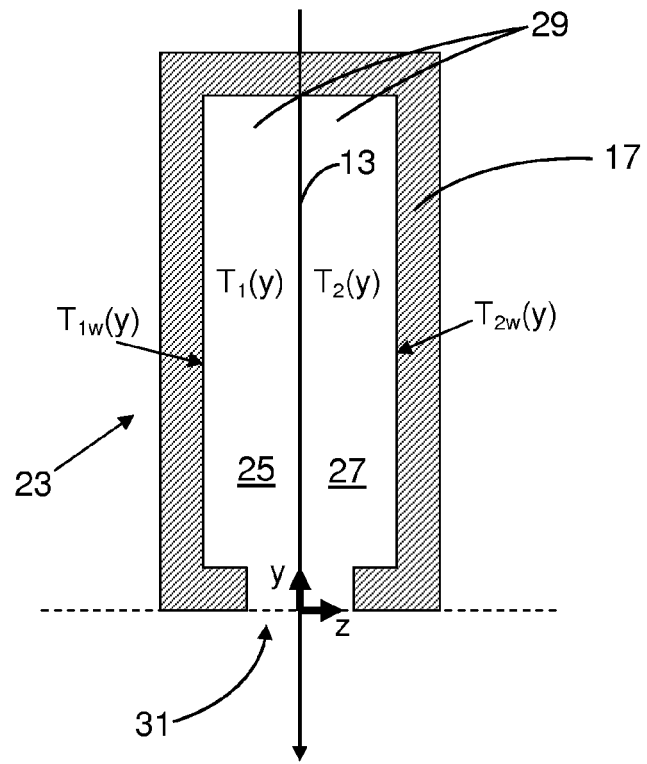
FIG. 3 is a schematic, cross-sectional, view of the geometry used in the analysis of the stack effect.

In order to protect the molten glass from contamination and to help control its temperature, isopipe 3 and the glass ribbon are contained within an enclosure 23. The inner surface of this enclosure includes banks of windings for controlling the temperature (cooling rate) of the ribbon as it passes through the enclosure (down the draw). The cross-section shown in FIGS. 1 and 3 is along a plane cutting the depth of the enclosure (front-to-back), the width of the enclosure (side-to-side) being parallel to the surface of the ribbon and usually substantially greater than the depth.

As part of the overall process, individual glass sheets must be separated from the moving glass ribbon. This typically involves scoring the ribbon and then separating the portion of the ribbon below the score line (the individual glass sheet) from the rest of the ribbon by bending the sheet relative to the surface of the ribbon along the score line so that the sheet breaks away from the ribbon at the score line. The scoring and bending is normally performed by contacting one side of the ribbon with a moving anvil, scoring the other side, and then breaking the individual sheet away from the ribbon by bending it about the anvil at the score line. A typical location for the sheet separating equipment is shown in FIG. 1 by the reference number 19. As shown, the separation takes place below enclosure 23.

It is desirable for stability of the scoring and breaking process that the glass ribbon be curved in such a way that the ribbon's edges, rather than its center, touch the anvil along which the ribbon will be bent. Scoring of the glass starts at one edge and proceeds to the other. It is desirable that the edges are on the anvil during this process so the ribbon is not twisted by being pressed flat by the scoring head. During separation the crack starts preferably at one or both edges and proceeds toward the center. If the edges are touching the anvil when bending is initiated, then the area under the most stress is also at the edge, causing the crack to be initiated there.

In fusion forming processes, the ribbon can often have several stable configurations that differ in shape. Variation in the process conditions can cause the ribbon to switch among these stable configurations. This is especially so for wide and/or thin ribbons which have a low effective stiffness thus allowing easy transitions among the various stable configurations. Among other places, the ribbon shape at the separation point can change dynamically. These changes in shape can be so substantial that the curvature across the ribbon can change sign. As described above, any and all of these changes in shape negatively affect the separation process. These changes in shape also affect product properties, in some cases rendering the glass sheets unacceptable to customers. Hence, it is desirable that the shape of the ribbon in the process remain stable with only small changes over time.

In a fusion forming process there is some control over the ribbon shape at the separation point through manipulation of the ribbon temperature. However, the temperature must be manipulated above the separation point, since the separation equipment obstructs access to the ribbon for heating and cooling. Thus the utility of manipulating the ribbon temperature is somewhat restricted. Further control of the ribbon shape is offered through various physical means such as rollers, air bearings, and other similar equipment. Although effective, equipment that physically touches the glass ribbon often reduces the operating window of the process, rendering it more sensitive to small process variations. Especially, clamping the ribbon on the edges is problematic.

In contrast to these prior approaches, the present disclosure uses the "stack effect" (see below) to produce a pressure difference across the ribbon which serves to control its bow or, more generally, its shape. It should be noted that the present disclosure can be used with shape control techniques of the type previously used and described above, although use of the techniques disclosed herein without resort to other techniques may be desirable in certain applications.

Figure 2:
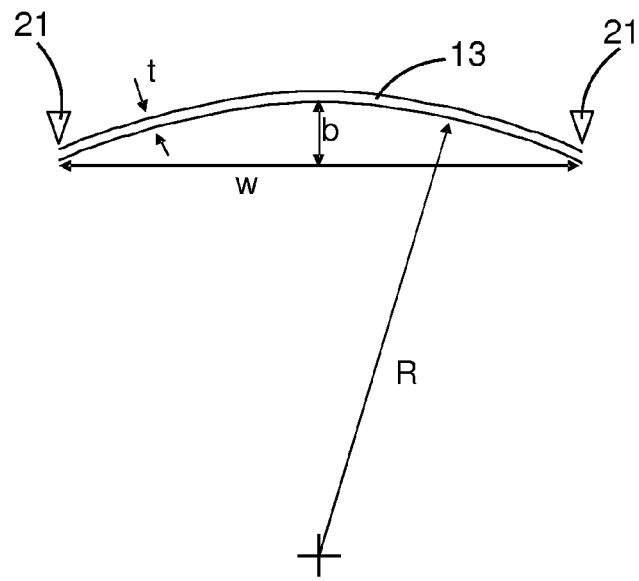
FIG. 2 shows the analysis geometry and variable definitions used in the analysis of bending due to pressure on one side of a ribbon.

In general terms, a wide glass ribbon, supported on its vertical edges and unrestrained on the top and bottom, may be curved by uniform pressure loading on one side with the edges supported (restrained) on the other side. The basic geometry is shown in FIG. 2, where 13 is the glass ribbon, "w", "t", and "R" are, respectively, the ribbon's width, thickness, and radius of curvature, and "b" is its displacement with respect to a plane passing through edge constraints 21, i.e., "b" is the ribbon's maximum out-of-plane displacement.

Assuming the ribbon is otherwise unloaded, the deflection of the center of the ribbon due to a differential pressure $\Delta P_{1-2}$ across its thickness is given by:

$$b = \frac{5\Delta P_{1-2} w^4 (1-v^2)}{32Et^3} \quad \text{Eq. (1)}$$

where E is the glass' Young's modulus, v is its Poisson ratio, and the pressure difference $\Delta P_{1-2}$ is from the glass' concave side (higher pressure side; side 1) to its convex side (lower pressure side; side 2). In this equation it is assumed that the ribbon is unrestrained at the top and bottom. The above equation is easily rearranged to give the pressure loading required to obtain a given deflection.

$$\Delta P_{1\text{-}2} = \frac{32bEt^3}{5w^4(1-v^2)} \quad \text{Eq. (2)}$$

Importantly, as the following representative calculation shows, the required pressures needed to create or stabilize a bow having a substantial magnitude (e.g., two centimeters at its center) are not large. For example, consider a ribbon with the following representative properties:

| | | |
|---|---|---|
| Width | w | 2500 mm |
| Thickness | t | 0.7 mm |
| Young's Modulus | E | 71016 Mpa |
| Poisson ratio | v | 0.23 |
| Desired bow | b | 20 mm |

For these values, from Eq. (2), $\Delta P_{1\text{-}2}$ is 0.084 Pa. As discussed below, in accordance with the present disclosure, pressure differences of this and larger magnitudes are achieved by creating density differences for the gas on either side of the ribbon. As also described below, the density differences create the pressure differences through a phenomenon known as the "stack effect."

In the following analysis, the ribbon is assumed to act as a septum dividing the enclosure's internal volume 29 into two sub-volumes 25 and 27 (see FIGS. 1 and 3). The sub-volumes will typically have similar volumes, but can have substantially different volumes if desired. In practice, the ribbon does not extend across the entire width of the internal volume of the enclosure. In addition, as shown in FIG. 1, the ribbon does not necessarily extend over the entire length of the enclosure. Consequently, gas can flow around the ribbon's side edges and/or over the top of the ribbon. In this sense, the ribbon is not a perfect septum, i.e., it can be thought of as a partial septum, but it does provide enough flow isolation between the sub-volumes so that a pressure difference can be maintained. (As used herein and the claims, the word "septum" refers to such a partial septum, as opposed to a perfect septum.) As a general rule of thumb, the ribbon should extend across at least approximately 80% of the width of the internal volume of the enclosure.

Along the same lines, the wall 17 of enclosure 23 will not, in general, be a perfect wall which prevents all flow between the surrounding atmosphere and the enclosure's internal volume 29. Rather, like the ribbon, the wall only needs to provide sufficient isolation between each of sub-volumes 25 and 27 and the surrounding atmosphere so that desired pressure levels can be maintained within the sub-volumes.

In practice, the gas filling the two sub-volumes will typically be the same and will be air. However, if desired for specific applications, gases other than air can be used (e.g., helium) and the gases on the two sides of the ribbon (septum) can be different, which in and of itself can produce a pressure difference across the ribbon (see the discussion of Eq. (7) below).

As shown in FIG. 3, stripped of its details, the enclosure of FIG. 1 can be treated as a simple box, closed on the top and open on the bottom, which is separated into two sides by a glass ribbon, with gases filling each of the sides. In the following, we will refer to the first side of the ribbon where z<0 as side 1 and the second side of the ribbon where z>0 as side 2. Note that when used in connection with the separation of individual glass sheets from a ribbon, side 1 will normally be on the anvil side of the separation equipment and will have the lower density/higher pressure.

If the densities of the gases on each side of the ribbon are not the same, pressure differences will result according to what is referred to by HVAC engineers as the "stack effect." A discussion of the stack effect can be found in, for example, the ASHRAE Fundamentals Handbook. See also Wang, S., Handbook of Air Conditioning and Refrigeration ($2^{nd}$ Edition), McGraw-Hill, 2001.

In accordance with the stack effect, the pressure difference between the two sides of the enclosure can be written:

$$P_1(y) - P_2(y) = g\int_0^y [\rho_2(y') - \rho_1(y')]dy' \quad \text{Eq. (3)}$$

where y, g, $P_1$, $P_2$, $\rho_1$, and $\rho_2$ correspond to the following:
   y vertical elevation coordinate, increasing opposite the direction of gravity and zero at the bottom of the enclosure
   g gravity, nominally 9.81 m/s$^2$
   $P_1$ pressure on side 1 of the enclosure
   $P_2$ pressure on side 2 of the enclosure
   $\rho_1$ density of the gas on side 1 of the enclosure
   $\rho_2$ density of the gas on side 2 of the enclosure
and where the pressure at the bottom of the enclosure (y=0) satisfies the following condition:

$$P_1(0)=P_2(0) \quad \text{Eq. (4)}$$

This condition applies because the bottom of the enclosure is open to the atmosphere.

As can be seen from Eq. (3), if the density on side 1 is lower than that on side 2, then the pressure on side 1 is higher. Since in Eq. (3) the pressure difference arises from an integral of the density differences, it is not necessary to maintain a density difference over the entire height of the enclosure, but only over a subset of the entire height. We refer to the portion or portions of the enclosure with density differences between sides 1 and 2 as density difference zones, or DDZs. For ease of presentation, in the following discussion, except where indicated, it is assumed that the enclosure has only a single DDZ, it being understood that in practice, the enclosure can include multiple DDZs spaced over the length of the enclosure. Indeed, in some cases, the entire length of the enclosure can function as a DDZ.

Over the DDZ, we can define an average difference in density as:

$$\overline{\Delta\rho} = \frac{\int_{y_b}^{y_t} [\rho_2(y') - \rho_1(y')]dy'}{y_t - y_b} \quad \text{Eq. (5)}$$

Here the DDZ starts at elevation $y_b$ and ends at elevation $y_t$. As noted above, the elevations $y_b$ and $y_t$ can be the bottom and top of the enclosure.

Using Eqs. (1) and (3) above, the following relationship can be obtained relating the average density difference over the DDZ with the resulting magnitude "b" of the bow:

$$\overline{\Delta\rho} = \frac{32bEt^3}{5w^4(1-v^2)g(y_t - y_b)} \quad \text{Eq. (6)}$$

At elevations above the DDZ, the ribbon bow is approximately "b" unless there is another DDZ in the enclosure or other loading of the ribbon. Below the DDZ, the ribbon does not have a differential pressure load so it does not reach the desired bow, although depending on the properties of the ribbon, it will exhibit a stable configuration for substantial distances below the DDZ. In certain embodiments, as opposed to generating a new bow, the DDZ can be used to stabilize an existing bow. In such a case, the direction of the bow will be chosen to match that of the existing bow. The presence of the DDZ will then reduce the likelihood that the ribbon's shape will switch out of the bowed condition into another, less desirable, configuration. As discussed above, shape stability is of particular value in connection with the separation of individual glass sheets from the ribbon. As a further alternative, the DDZ can oppose a pre-existing bow, thus aiding in switching the ribbon to a different, more desirable, configuration. As used herein the phrase "controlling the bow of a glass ribbon" is intended to include these and other applications of a DDZ to influence the shape of a glass ribbon.

The density differences needed to generate the pressure differences required to bow the ribbon can be due to the composition of the gas on each side of the ribbon. Thus, by using gases having different compositions on the two sides of the ribbon, different densities can be produced even if the temperature distributions on the two sides are the same. More commonly, temperature differences are used to produce the density differences and thus the pressure differences.

In a stationary or quasi-stationary gas close to atmospheric pressure, density is approximately related to pressure and temperature by the ideal gas law:

$$\rho = \frac{PM}{RT} \quad \text{Eq. (7)}$$

where:

| Gas density | $\rho$ | |
|---|---|---|
| Pressure | P | approximately 101325 Pa = 1 atm |
| Molecular weight | M | for air, 28.8 kg/kmol |
| Gas constant | R | 8314 J/kmol/K |
| Gas Temperature | T | |

If the pressure changes are small, as is the case in a downdraw tower, density can be regarded as a function of just temperature and composition. Composition affects density through the average molecular weight of the gas, i.e., M in Eq. (7). In the following, we assume that the composition is the same on both sides of the glass ribbon, so density is a function of temperature only. Thus, using Eq. (7), the pressure difference across the ribbon can be written:

$$P_1(y) - P_2(y) = \frac{gM\bar{P}}{R} \int_0^y \left[ \frac{1}{T_2(y')} - \frac{1}{T_1(y')} \right] dy' \quad \text{Eq. (8)}$$

where:

| Average pressure | $\bar{P}$ |
|---|---|
| Gas temperature on side 1 | $T_1$ |
| Gas temperature on side 2 | $T_2$ |

As can be seen from Eq. (8), a pressure difference from side 1 to side 2 can be generated by a temperature difference between the sides. A temperature difference can be generated by a number of means, the simplest of which is electric heating with higher power input to one side of the ribbon than the other. This has the effect of heating the gas on the side of the ribbon with higher power. The higher temperature gas has a lower density and thus in accordance with the stack effect, its pressure is higher than that of the lower temperature gas. Hence the ribbon will bow from the higher temperature side towards the lower temperature side, i.e., assuming it is restrained on its edges (see 21 in FIG. 2), it will be concave towards the higher temperature side and convex towards the lower temperature side.

Figure 4:
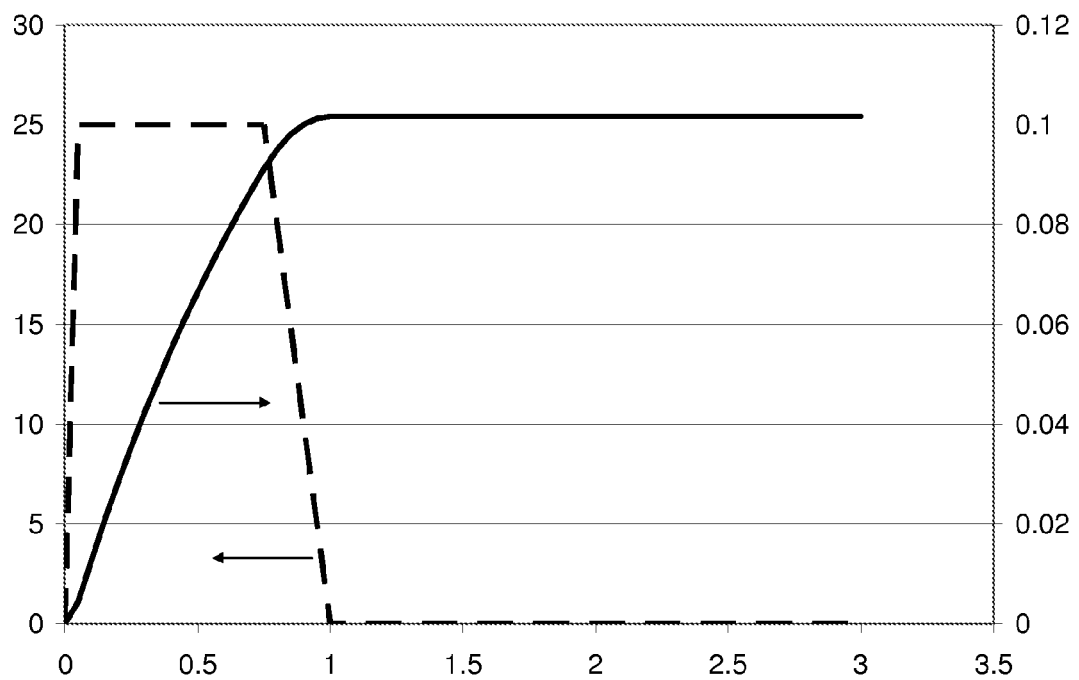
FIG. 4 is a plot of a calculated pressure curve (solid curve) for a DDZ produced by a step temperature differential (dashed curve) across a ribbon. The step temperature differential is located at the bottom of an enclosure (draw tower).
Figure 5:
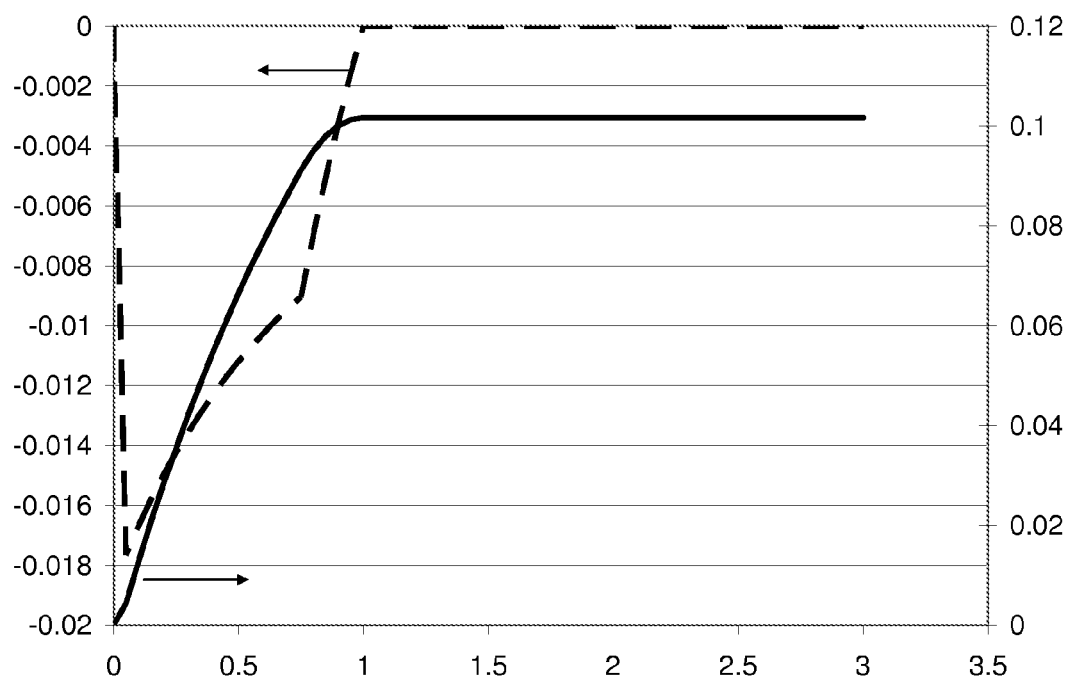
FIG. 5 is a plot which repeats the calculated pressure curve (solid curve) of FIG. 4 and also shows the differences in gas density produced by the step temperature differential.

An example of the effects of such a temperature difference is illustrated in FIGS. 4 and 5. In these figures and in FIGS. 6-7 and 8-9, the horizontal axis represents elevation from the bottom of the enclosure in meters, the right hand vertical axis represents pressure difference ($P_1-P_2$) in pascals, and the left hand vertical axis represents temperature difference ($T_1-T_2$) in ° C. for FIGS. 4, 6, and 8, and density difference ($\rho_1-\rho_2$) in kg/m³ for FIGS. 5, 7, and 9. The solid curve in each figure shows the pressure difference, while the dashed curve shows the temperature difference in FIGS. 4, 6, and 8, and the density difference in FIGS. 5, 7, and 9. The horizontal arrows in these figures indicate which vertical axis applies to the solid and dashed curves. Throughout FIGS. 4-9, the gas used for the calculations is air with a molecular weight of 28.8 kg/kmol and other physical properties readily available in standard references.

For the case examined in FIGS. 4-5, higher power is applied on side 1 of the ribbon to cause a higher temperature there (e.g., $T_{1W}(y) > T_{2W}(y)$ in FIG. 3 so that $T_1(y) > T_2(y)$, where $T_{1W}(y)$ and $T_{2W}(y)$ are wall temperatures and $T_1(y)$ and $T_2(y)$ are gas temperatures). The higher temperatures on side 1 are only in the lowest part of the enclosure. Alternatively, lower power could be applied to side 2 or relatively cool gas could be introduced into side 2 to achieve the relatively higher average density on this side. Due to the pressure being a function of the integral of the density, the pressure difference once formed extends upward through the rest of the enclosure, even though the temperature difference is only in the lowest part of the enclosure. This effect is illustrated in FIGS. 4 and 5 by the flat portions of the pressure curves.

Figure 6:
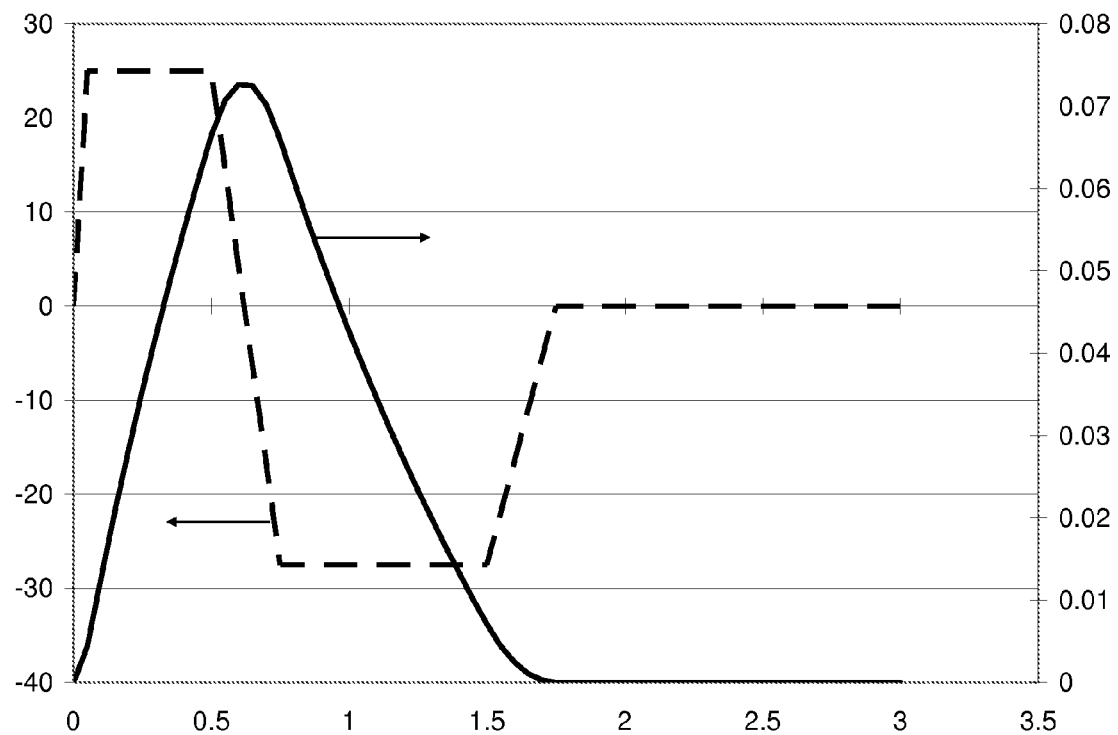
FIG. 6 is a plot of a calculated pressure curve (solid curve) for two DDZs produced by upward then downward step temperature differentials (dashed curve) across a ribbon. The first step temperature differential is located at the bottom of an enclosure (draw tower) and the second step temperature differential is located immediately above the first step temperature differential.
Figure 7:
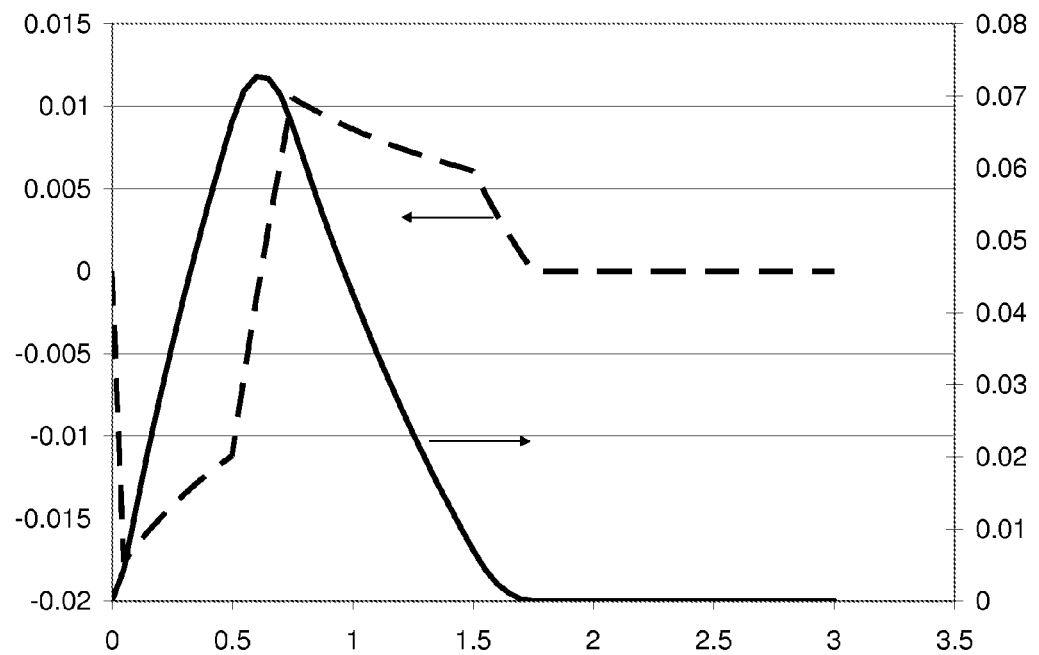
FIG. 7 is a plot which repeats the calculated pressure curve (solid curve) of FIG. 6 and also shows the differences in gas density produced by the step temperature differentials.

If it is desired that there be a pressure difference in only one part of the enclosure, then the density difference can be reversed above the initial DDZ to make a second, vertically higher, DDZ that cancels the pressure difference in the lower zone. Such an arrangement is shown in FIGS. 6 and 7. As can be seen in these figures, the temperature is elevated for approximately 0.5 meters (the lower DDZ) and then depressed for approximately 1.0 meter (the higher DDZ), the elevation and depression being of approximately equal magnitudes. The density of the gas on side 1 is reduced in the lower DDZ relative to that on side 2 causing the relative pressure to rise due to the stack effect. In the higher DDZ, the density on side 1 is increased relative to that on side 2 causing the relative pressure to drop, again due to the stack effect. In this way, a positive pressure difference between sides 1 and 2 can be obtained over a limited length of the enclosure.

A second means of attaining a temperature difference between the two sides of the enclosure is to allow gas flow to occur on one side or the other or, more generally, to provide for a difference in gas flow rates on the two sides. For example, if a hole (aperture) is placed in the side or top of the enclosure on one side of the ribbon, but not the other, gas will flow in the bottom and upward and out of the hole due to the stack effect on the one side, but not on the other. Note again that the ribbon is not a perfect septum, so that there may be flow on the side without the aperture, but it will be less than on the side with the aperture. As another alternative, the gas flows on the two sides of the ribbon can be adjusted actively by using a fan, pump, and/or other equipment (e.g., a flow controller) to achieve the desired flow rate differential.

By whatever means the differential flow rate is achieved, on the side with the relatively higher flow rate, the gas is at a lower temperature because power is required from the glass and the enclosure structure, e.g., from the enclosure's heater windings, to increase the gas' temperature. On a non-flowing (or less flowing) side no (or less) power is required so the temperature of the gas is higher. An approximate model for the air temperature on a flowing side (assumed to be side 2) is as follows:

$$\frac{d}{dy}T_2(y) - \frac{2h}{w_2 C_p}[T_2(y) - T_w(y)] = 0 \qquad \text{Eq. (9)}$$

where:

| | |
|---|---|
| Heat transfer coefficient | h |
| Temperature of glass and enclosure wall | $T_w$ |
| Gas flow rate on side 2 | $w_2$ |
| Heat capacity of gas | $C_p$ |

Solving this equation for $T_2(y)$ gives the temperature in the flowing side as a function of y, which when substituted into Eq. (8) gives a pressure difference between the two sides. If side 1 also had flow, a similar equation to Eq. (9) could be written for this side and then used in Eq. (8).

Figure 8:
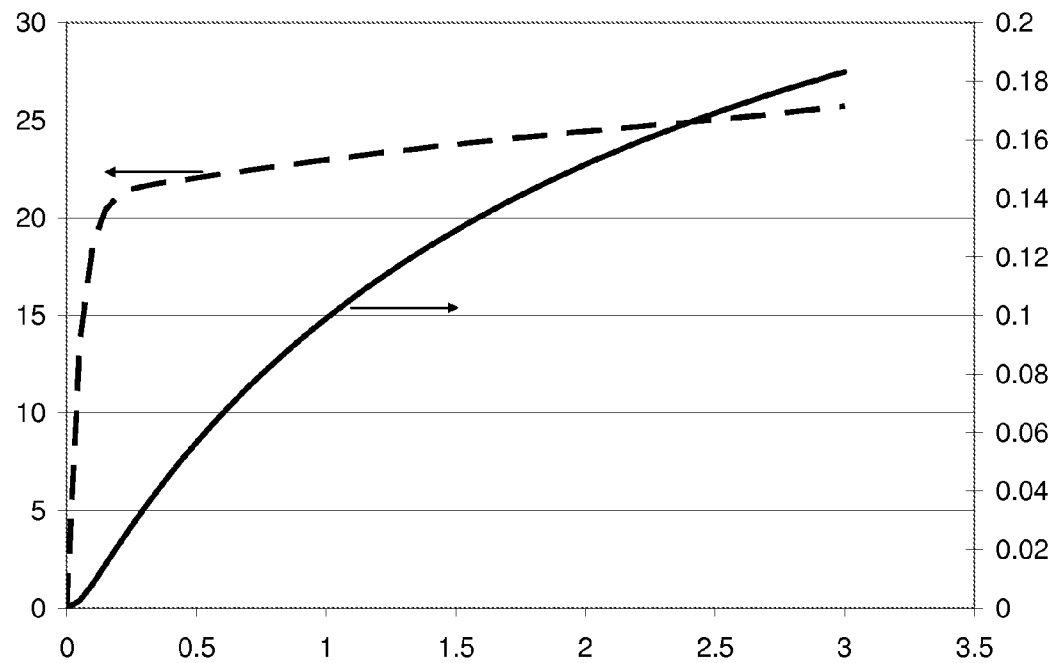
FIG. 8 is a plot of a calculated pressure curve (solid curve) for a DDZ produced by a temperature differential (dashed curve) across a ribbon generated by a difference in gas flows on two sides of a ribbon.
Figure 9:
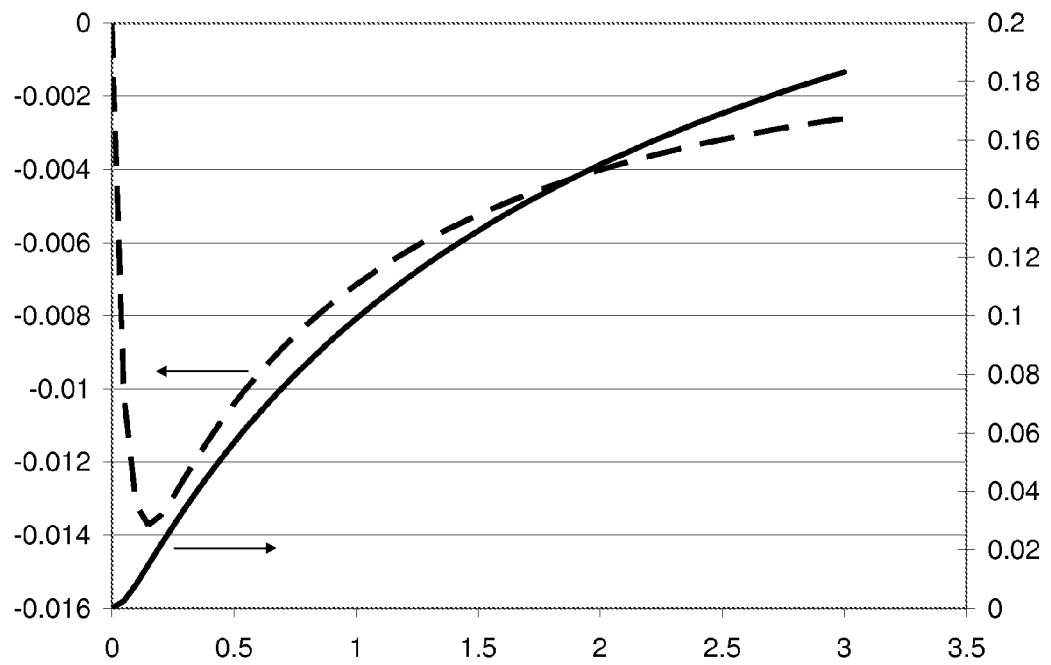
FIG. 9 is a plot which repeats the calculated pressure curve (solid curve) of FIG. 8 and also shows the differences in gas density produced by the difference in gas flows.

An example of the temperature and pressure differences that can be produced by flow on side 2 is given in FIGS. 8 and 9. The values used for the heat transfer coefficient h and the flow rate $w_2$ are 20 W/m²/° K and 0.001 kg/sec/m, respectively. As can be seen, substantial temperature differences and hence substantial density differences can be achieved, allowing the stack effect to generate substantial pressure differences between side 1 and 2 ($P_1 > P_2$).

It should be noted that although gas density can be difficult to measure directly, it is straightforward to measure it indirectly and thus determine if a DDZ is being used in a draw tower. Specifically, if the gas on both sides of the ribbon is the same, measurements of gas temperature on both sides of the ribbon can be used to calculate gas densities by standard methods. A plot of gas density on each side of the enclosure vs. elevation then clearly shows the presence of one or more DDZs. This is the case whether gas is flowing or not. In the case where the composition of the gas differs from one side to the other, measurements of temperature and composition at a number of elevations are used to calculate a density distribution. Specifically, density is calculated from the temperature and composition data by standard methods and again a plot of density vs. elevation shows the presence of one or more DDZs.

The standard methods for transforming temperature measurements into density measurements (or temperature and composition measurements into density measurements) can be as simple as referring to density tables in commonly-available reference works (e.g., tables for the density of air at different temperatures), or can involve the construction of such tables in the case of less well studied gases. Models (e.g., empirical models) can also be used for this purpose. For example, in some cases the ideal gas law may be useful in transforming temperature and/or composition measurements into density values. Depending on the application, pressure information may also be incorporated in the density determination.

It should be noted that the stack effect works in the opposite direction to the effect of different compression/tension forces on a glass ribbon as a result of a temperature gradient across its thickness. Importantly, the stack effect is many times stronger than the compression/tension force effect. The following analysis illustrates the difference.

A temperature difference across the ribbon thickness causes bow according to $$b = \frac{\alpha \Delta T_r w^2}{8t} \qquad \text{Eq. (10)}$$

$$\Delta T_r = \frac{8tb}{\alpha w^2}$$

where $\alpha$ is the thermal expansion coefficient (CTE) of the ribbon material and $\Delta T_r$ is the temperature difference across the ribbon with the hot side being the convex side of the ribbon.

In practice, $\Delta T_r$ is a function of the process conditions. If there is air on each side of the ribbon and if the air temperatures on the two sides are different, the temperature difference across the ribbon will be given by $$\Delta T_t = \frac{h}{h + \frac{2k}{t}}(T_1 - T_2) = \frac{h}{h + \frac{k}{t}} \Delta T_{1-2} \qquad \text{Eq. (11)}$$

$$\Delta T_{1-2} = T_1 - T_2$$

where h is the heat transfer coefficient between air and the ribbon, and k is the effective thermal conductivity of the ribbon including radiation effects. As above, the temperatures on the two sides of the ribbon are given by $T_1$ and $T_2$ and thickness of the ribbon is t.

Eliminating the temperature difference between the surfaces of the ribbon gives:

$$\frac{h}{h + \frac{2k}{t}} \Delta T_{1-2} = \frac{8tb}{\alpha w^2} \qquad \text{Eq. (12)}$$

$$\Delta T_{1-2} = \left(1 + \frac{2k}{ht}\right) \frac{8tb}{\alpha w^2}$$

In most production situations, k/ht>>1 so $$\Delta T_{1-2} = \frac{k}{h} \frac{16b}{\alpha w^2} \qquad \text{Eq. (13)}$$

For a practical situation, k=3.5 W/m/° K, h=20 W/m²/° K, w=2500 mm, and $\alpha$=3.5 ppm/K, so that to achieve a bow of two centimeters (b=20 mm) requires a temperature difference of:

$$\Delta T_{1-2} = \frac{k}{h} \frac{16b}{\alpha w^2} = 2560K \qquad \text{Eq. (14)}$$

This is clearly outside the useful range of temperature differences. For comparison, the temperature differences of FIGS. 4, 6, and 8 are on the order of 100 times smaller.

From the foregoing, it can be seen that methods have been provided for controlling ribbon shape in a downdraw glass forming process, e.g., a fusion forming process. The control is achieved by changing the pressure of the gas (e.g., air) on each side of the ribbon using the stack effect. Pressure is manipulated not by flow but by temperature or composition which changes the gas' density and thus the gravitational head of the gas columns on the two sides of the ribbon. As between gas temperature and gas composition, the pressure is preferably manipulated by temperature, e.g., using electrically heated windings or by injecting cold or hot air near the ribbon on one side or the other. The temperature differences needed are easily achieved in practice. Physical constraints, e.g., rollers, are arranged along the edge of the ribbon so that the gas pressure forces the ribbon against the constraints and causes the ribbon to bend laterally.

Through the use of these methods, a bowed shape can be maintained with minimal physical constraint of the ribbon, allowing maximum tolerance to process variation. Further, the equipment needed to implement the methods is simple, inexpensive, and robust. The stabilization of the ribbon to process variations is greater than has been available previously.

A variety of modifications that do not depart from the scope and spirit of the invention will be evident to persons of ordinary skill in the art from the foregoing disclosure. For example, although the above examples have assumed that the cross-sectional area of the sub-volumes remained constant over the length of the draw tower, the analysis can be readily extended to systems where the cross-sectional area varies with elevation. The following claims are intended to cover the specific embodiments set forth herein as well as modifications, variations, and equivalents of this and other types.

What is claimed is:

1. A method of causing the bow of a vertical glass ribbon produced by a downdraw process comprising:
   (a) passing the ribbon through a gas-filled vertical enclosure, wherein:
      (i) the enclosure comprises a wall that defines an internal volume,
      (ii) the bottom of the internal volume is open so that the pressure at the bottom is the pressure of the surrounding atmosphere, and
      (iii) the ribbon acts as a septum that divides the enclosure's internal volume into a first sub-volume and a second sub-volume;
   (b) producing a difference between a pressure of the first sub-volume and a pressure of the second sub-volume along at least a portion of the length of the enclosure, the pressure of the first sub-volume being greater than the pressure of the second sub-volume, by creating, over a vertical zone along the length of the enclosure, a difference between (i) the average density of gas which is on the first sub-volume side of the ribbon and (ii) the average density of gas which is on the second sub-volume side of the ribbon, the average density on the first sub-volume side of the ribbon being less than the average density on the second sub-volume side of the ribbon; and
   (c) constraining the edges of the ribbon so as to prevent movement of the edges into the second sub-volume over at least the vertical zone, said positive pressure difference causing bowing of the sheet.

2. The method of claim 1 wherein the difference between the average densities of the gases on the first and second sub-volume sides of the ribbon over the vertical zone is the result of a difference in the composition of the gases on the first and second sub-volume sides of the ribbon over the vertical zone.

3. The method of claim 1 wherein the difference between the average densities of the gases on the first and second sub-volume sides of the ribbon over the vertical zone is the result of a difference in the average temperatures of the gases on the first and second sub-volume sides of the ribbon over the vertical zone, the average temperature of the gas on the first sub-volume side of the ribbon being greater than the average temperature of the gas on the second sub-volume side of the ribbon.

4. The method of claim 3 wherein the difference in average temperatures is the result of a difference between the average temperature of the internal surface of the enclosure's wall on the first sub-volume side of the ribbon and the average temperature of the internal surface of the enclosure's wall on the second sub-volume side of the ribbon along the internal perimeter of at least one cross-section through the enclosure within the vertical zone.

5. The method of claim 1 wherein the difference between the average densities of the gases on the first and second sub-volume sides of the ribbon over the vertical zone is the result of a difference in the average flow rates of the gases on the first and second sub-volume sides of the ribbon over the vertical zone, the average flow rate of the gas on the first sub-volume side of the ribbon being lower than the average flow rate of the gas on the second sub-volume side of the ribbon.

6. The method of claim 5 wherein the difference in the average rates of flow are the result of differences in the amount of gas exiting the two sub-volumes to the surrounding atmosphere at locations above the mid-plane of the vertical zone.

7. The method of claim 6 wherein the differences in the amount of gas exiting the two sub-volumes to the surrounding atmosphere is the result of at least one aperture formed in the enclosure's wall on the second sub-volume side of the ribbon at a location above the mid-plane of the vertical zone.

* * * * *